Patented Dec. 16, 1930

1,785,155

UNITED STATES PATENT OFFICE

EDWARD A. TAYLOR, OF CLEVELAND, OHIO, ASSIGNOR TO THE GRASSELLI CHEMICAL COMPANY, OF CLEVELAND, OHIO, A CORPORATION OF DELAWARE

ZINC-CHLORIDE-BASE FLUX

No Drawing.   Application filed December 26, 1929.  Serial No. 416,757.

Zinc chloride is the base of a large number of commercial fluxes used in soft soldering operations.

It is used in aqueous or alcoholic solutions with or without the addition of various compounds, such as hydrochloric acid, ammonium chloride, fusel oils, etc.

I have found that the addition of alkyl-naphthalene sulfonic acid compounds, such as the free acids themselves and their salts to fluxes, in which zinc chloride is the base, or main active ingredient, improves their spreading and wetting properties, particularly on oily or greasy metal surfaces.

The alkyl-naphthalene sulfonic acid compounds useful in my invention are chemically characterized by having one or more hydrocarbon radicle attached to one or more carbon atoms of the napthalene nucleus. Amongst these I found that those in which the substituent has more than two carbon atoms are particularly efficient. It seems also essential that the substituent is of non-benzenoid nature. These alkyl-naphthalene sulfonic acid compounds have in common the property of reducing the surface tension of water in which they are dissolved. While I do not have any theoretical explanation for the beneficial action of my novel addition agents to zinc chloride fluxes I believe that this action is in some manner connected with the reduction of the surface tension obtained by these addition agents.

Typical examples of this class of substances which I have added to zinc chloride base fluxes and found to improve their spreading properties are propyl-, butyl-, benzyl-, cyclohexyl-naphthalene sulfonic acids and their salts, and the term alkyl-naphthalene sulfonic acid compounds, as used herein, is intended to embrace those compounds in which the substituent is a radicle of an aliphatic or ar-arkyl, i. e., benzyl or other non-benzenoid hydrocarbon.

While the alkyl naphthalene sulfonic acid alkali metal salts are fairly soluble in water, their solubility is less in zinc chloride solutions; the amounts needed to improve the spreading and wetting properties of zinc chloride fluxes is, however, rather small. Usually 0.1% of the weight of the flux of an alkyl-naphthalene sulfonic acid added to the flux is sufficient to produce the improved properties. The addition of larger amounts, up to several per cent, of an alkyl naphthalene sulfonate produces a sediment in the flux which is in no way detrimental, it also seems to go partly in solution during the soldering operations when the flux attains higher temperatures. This probably accounts for the fact that fluxes to which 0.25, and more of the alkyl-naphthalene sulfonic acid compound have been added show a greater spread on the metal than clear solutions containing the addition agents only in such amounts which will dissolve therein.

The full value of my addition agents develops particularly in fluxes in which the zinc chloride has been dissolved in dilute alcohol.

My novel fluxes are conveniently prepared by adding the alkyl-naphthalene sulfonic acid compound to the zinc chloride flux, or by jointly dissolving the addition agent, the zinc chloride and other ingredients, or in any other convenient manner.

A very efficient flux with improved wetting properties is, for instance, obtained by adding 1 part butyl-naphthalene sodium sulfonate to

| | Parts |
|---|---|
| Muriatic acid 20° Bé | 25 |
| Zinc chloride 70% solution | 45 |
| Ammonium chloride crys. | 5 |
| Denatured alcohol | 25 |

The parts given are by weight.

The surface covered by a given amount of this flux was found to be about 5 times that of the same flux in which the butylnaphthalene sulfonic acid had been omitted.

Various combinations and proportions of components are used in common zinc chloride base fluxes. I found in all zinc chloride fluxes tested that the addition to such fluxes of a small amount of an alkyl-naphthalene sulfonic acid compound which has the property of reducing the surface tension of water, when dissolved therein, acts beneficially in that the modified flux has a greater spread.

My improved fluxes are used in exactly the same manner as ordinary zinc chloride fluxes. It will be found that they reach into the corners and irregularities of the metal pieces to be united and distribute the solder to such places much better than ordinary zinc chloride fluxes. This is particularly noticeable on oily or greasy metal surfaces, where my novel fluxes cut through the film of oil or grease present on the surfaces.

Zinc chloride base fluxes are normally kept acid by the addition of hydrochloric acid; it seems immaterial whether the free alkyl-naphthalene sulfonic acids or their salts are added to such acid fluxes, as in all instances the composition of the final material, as far as the addition agent is concerned, will be substantially the same.

The alkyl-naphthalene sulfonic acid compounds can also be added to non-aqueous zinc chloride fluxes of various compositions, for instance, those where an animal or vegetable fat or a mineral oil is used as the vehicle for zinc chloride.

I claim:

1. As a new composition of matter a soldering flux in which zinc chloride is the base, comprising zinc chloride and an alkyl naphthalene sulfonic acid compound.

2. As a new composition of matter a soldering flux in which zinc chloride is the base, comprising zinc chloride and an alkyl-naphthalene sulfonic acid compound which has the property of lowering the surface tension of water when dissolved therein.

3. As a new composition of matter a soldering flux comprising a solution of zinc chloride and an alkyl-naphthalene sulfonic acid compound which has the property of lowering the surface tension of water when dissolved therein.

4. As a new composition of matter a soldering flux comprising an aqueous alcoholic solution of zinc chloride and an alkyl-naphthalene sulfonic acid compound which has the property of lowering surface tension of water when dissolved therein.

5. In a process of soft soldering metals the step of applying a zinc chloride flux in the presence of an alkyl-naphthalene sulfonic acid having the property of decreasing the surface tension of water, when dissolved therein.

In testimony whereof, I affix my signature.

EDWARD A. TAYLOR.